United States Patent
Gammel et al.

(10) Patent No.: US 9,916,261 B2
(45) Date of Patent: Mar. 13, 2018

(54) RANDOMIZED MEMORY ACCESS

(71) Applicant: Infineon Technologies AG, Neubiberg (DE)

(72) Inventors: Berndt Gammel, Markt Schwaben (DE); Tomaz Felicijan, Graz (AT); Stefan Mangard, Munich (DE); Walter Mergler, Munich (DE)

(73) Assignee: Infineon Technologies AG, Neubiberg (DE)

( * ) Notice: Subject to any disclaimer, the term of this patent is extended or adjusted under 35 U.S.C. 154(b) by 26 days.

(21) Appl. No.: 14/280,823

(22) Filed: May 19, 2014

(65) Prior Publication Data

US 2015/0331810 A1 Nov. 19, 2015

(51) Int. Cl.
*G11C 29/00* (2006.01)
*G06F 12/14* (2006.01)
*G06F 21/55* (2013.01)
*G06F 21/75* (2013.01)

(52) U.S. Cl.
CPC ........ *G06F 12/1408* (2013.01); *G06F 12/145* (2013.01); *G06F 21/558* (2013.01); *G06F 21/75* (2013.01); *G06F 2212/1052* (2013.01); *G06F 2212/251* (2013.01)

(58) Field of Classification Search
CPC .......... G06F 12/145; G06F 2212/1052; G06F 2212/251; G06F 12/1408
USPC ........................................................ 714/769
See application file for complete search history.

(56) References Cited

U.S. PATENT DOCUMENTS

| | | | | |
|---|---|---|---|---|
| 4,982,367 A | * | 1/1991 | Miyatake | 365/203 |
| 5,210,639 A | * | 5/1993 | Redwine | G09G 5/363 |
| | | | | 345/537 |
| 5,887,251 A | * | 3/1999 | Fehnel | H04L 63/06 |
| | | | | 340/5.21 |
| 5,999,474 A | * | 12/1999 | Leung et al. | 365/222 |
| 2005/0185472 A1 | * | 8/2005 | Randell et al. | 365/185.33 |
| 2013/0205080 A1 | * | 8/2013 | Felton | G06F 21/79 |
| | | | | 711/105 |

FOREIGN PATENT DOCUMENTS

| | | |
|---|---|---|
| CN | 102737719 A | 10/2012 |
| CN | 102799819 A | 11/2012 |
| CN | 103246853 A | 8/2013 |
| CN | 103778374 A | 5/2014 |
| TW | 476960 B | 2/2002 |

OTHER PUBLICATIONS

Office Action dated Aug. 18, 2017 for Chinese Patent Application No. 201510257729.1.

* cited by examiner

*Primary Examiner* — Guy Lamarre
(74) *Attorney, Agent, or Firm* — Schiff Hardin LLP

(57) ABSTRACT

An embodiment relates to a device for a memory access, the device having a first component for conducting operations on the memory and a second component for accessing the memory in a randomized manner, wherein the first component conducts at least a portion of the operations via the second component.

16 Claims, 1 Drawing Sheet

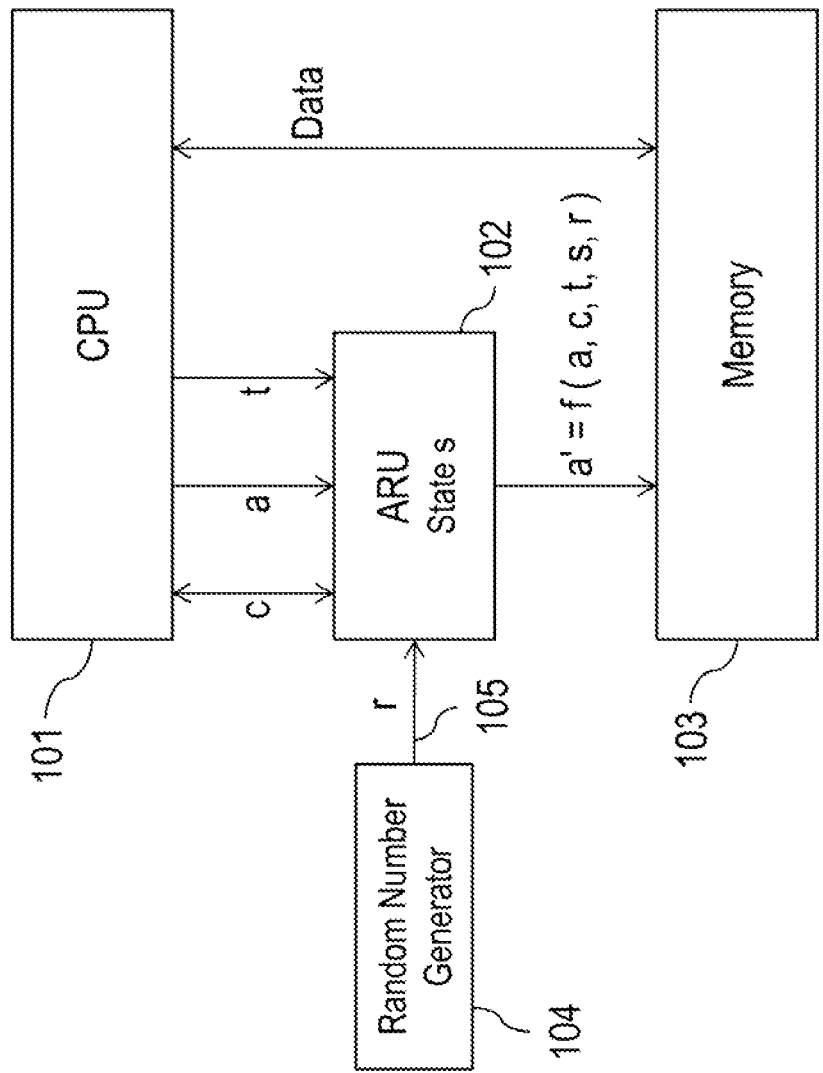

RANDOMIZED MEMORY ACCESS

BACKGROUND OF THE INVENTION

Embodiments of the present invention relate to a memory access that is at least partially randomized.

SUMMARY

A first embodiment relates to a device for a memory access, the device comprising
- a first component for conducting operations on the memory,
- a second component for accessing the memory in a randomized manner,
- wherein the first component conducts at least a portion of the operations via the second component.

The first component may be a processor or a controller. The second component may be another processing device, which may also refer to as address randomization unit.

A second embodiment relates to a second component that is arranged for
- receiving an information regarding a memory access from a first component,
- accessing the memory in a randomized manner based on the information and based on a random value.

A third embodiment relates to a method for accessing a memory comprising
- accessing the memory in a randomized manner by a second component, wherein a first component conducts at least a portion of the operations via the second component.

A forth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawing(s). The drawing(s) serve to illustrate the basic principle, so that only aspects necessary for understanding the basic principle are illustrated. The drawing(s) are not to scale. In the drawing(s) the same reference characters denote like features.

FIG. 1 shows a schematic diagram that allows for randomizing an execution sequence, wherein the randomization itself utilizes a different component, e.g., pieces of hardware.

DETAILED DESCRIPTION OF THE PREFERRED EMBODIMENTS

For many attacks on smart cards or embedded systems an attacker needs to know at what time which data value is processed. The attacker may probe the value, do a template attack or falsify the value. An example is the implementation of a cryptographic algorithm: If the attacker knows the time at which intermediate values are processed, he can perform various attacks on such intermediate values.

In order to raise the burden for an attack to be successful, the steps of an algorithm may be randomized, i.e. operations may be executed in a random order. However, not all steps may be subject to such reordering, because a certain succession may be inherent and necessary for the algorithm to work correctly and produce the results required.

There exist several algorithms, though, which have a degree of freedom with regard to their respective sequence of performing operations. For example, in the Advanced Encryption Standard, AES, an AES SubBytes operation is performed on 16 Bytes. The sequences in which the 16 operation are performed can be randomized, i.e. the 16 lookups may be performed in a random order. For example, operations that can be conducted in parallel may be subject to a randomization when performed in sequence.

A disadvantage, however, may be that the randomization for software implementations is also done in software. Hence, the random values that are used to randomize the execution sequence of a software implementation are produced by this very software. Consequently, the random values themselves are subject to the same attack as the data that needs to be protected.

For example: If an attacker probes (e.g., by putting needles on) a CPU data bus, he learns about the random values and all data that are processed in a randomized order (determined by said random values). In such scenario, the randomization has no effect, because the attacker is aware of it and may remove its effect without significant difficulty.

Similar considerations may apply for determining a power consumption of a device under attack: If the attacker is able to build a template on the values that are processed by the CPU, this template can be used to reveal the random values as well as the protected values, which may render the randomization ineffective.

Examples presented herein in particular allow randomizing an execution sequence of a software implementation in hardware, whereby the randomization may preferably be hidden from the software. Hence, random values that are used to generate the randomization sequence may not be provided and/or processed by the software and cannot be determined by an attack directed on the software. As the software is not aware of the randomization sequence, the processor (e.g. CPU) or the software cannot leak (or supply) any information about such randomization.

It is noted that the randomization may be a pseudo-randomization. Hence, any random value may be either a true random value or it may be calculated by a deterministic mechanism. In this context, good random numbers are qualified by the property that the attacker has no advantage in guessing the next random number also if he knows all previously generated random numbers.

An advantage of this approach is that it shifts the rather difficult problem of protecting one large component (e.g., a CPU) towards protecting several components, i.e. in addition to the large component a smaller component (e.g., a random generator and/or an address randomization unit). Hence, the attacker needs to direct his efforts towards several components (i.e. the large and the smaller one) instead of only one.

FIG. 1 shows a schematic diagram that allows for randomizing an execution sequence, wherein the randomization itself utilizes a different component, e.g., pieces of hardware. A software may configure a so-called address randomization unit ARU 102 to randomize an address that is sent from a CPU 101 to access a memory 103. If the ARU 102 is activated, it randomizes this address for accessing the memory 103 by using random values 105 from a random number generator 104. For different algorithms or parts of algorithms, different configurations of such randomization may be utilized. The ARU 102 can be configured accordingly.

The ARU 102 maps an input address a to an output address a'. The mapping may be based on at least one of the following:
- a configuration c of the ARU 102,
- an access type t,
- the input address a,
- a random value r, and
- an internal state s of the ARU 102.

The mapping may in particular be based on the address a, the configuration c may be explicitly provided or it may be hard-coded in the ARU 102. Optionally, the address a may be part of a configuration c. It is also an option that the access type t is supplied by the CPU 101 to the ARU 102.

The internal state s can be updated by different means. For example, the internal state s may be set to an initial state when loading the configuration c and it may be updated by read or writes accesses of the CPU 101. It is noted that read and/or write operations may lead to different state transitions and may hence have a (different) effect on the randomization of the address a.

The configuration c of the ARU 102 may comprise at least one of the following:
- a lower threshold for the randomized range a1,
- an upper threshold for the randomized range a2,
- a characteristic distribution of the randomization (e.g., a permutation).

At least one of the following configurations of the ARU 102 could be switched during runtime and may hence be the subject to the randomization:
- randomize an order of an access to a lookup table; in particular: randomize an order of AES S-box lookup operations;
- randomize an order of operations in commutative group operations;
- randomize an order of operations in associative group operations;
- randomize an order of an accumulation of terms in a sum or product;
- randomize an order of an accumulation of terms calculating a scalar product;
- randomize an order of an calculation of intermediate values in a vector or a matrix product; in particular: randomize an order of steps in a computation of an AES mix columns operation;
- randomize an order of operations on shares in a secret sharing scheme (assuming, e.g., that some variable is split into shares);
- randomize an order of accesses when reading components or shares of a secret key from a memory;
- randomize an order of operations in a symmetric cryptographic algorithm (DES, AES, etc.);
- randomize an order of operations in an asymmetric cryptographic algorithm (RSA, ECC, etc.);
- randomize an order of operations in a cryptographic hash algorithm (Whirlpool, SHA-1, SHA-2, SHA-3, etc.).

Exemplary Embodiment: Randomizing the Sequence of the 16 S-Box Lookups of an AES Round A sequence may be randomized in which the software performs an AES S-box operation on 16 byte values. Performing such AES S-box operation on 16 byte values means calculating $y_i = S(x_i)$, where $x_{0 \ldots 15}$ are input bytes and $y_{0 \ldots 15}$ are output bytes, i.e. 16 operations that may be conducted in parallel.

In a common software implementation this is done by repeating the following operations for each byte:
- read input byte $x_i$,
- perform S-box operation $S(x_i)$,
- write output byte $y_1$.

By using the ARU 102 to randomize the sequence in which the bytes are processed, the software code may (substantially) be the same. The ARU 102 only needs to be configured before executing the code.

In this example, the ARU 102 may be configured with a read memory area of 16 bytes and a write memory area of 16 bytes. For read operations, the ARU 102 may be configured such that the next 16 read operations from the read memory area will lead to a random permutation of the 16 byte values that are stored in the read memory area. Hence, the ARU 102 may replace the addressing within the 16 bytes provided by the CPU 101 with a random permutation. Hence, without the ARU 102, the CPU would use a predetermined scheme to address the 16 bytes, but this predetermined addressing scheme is randomized by the ARU 102 with the help of the random number generator 104.

For write permutations to the write memory area, the ARU 102 takes the same index that has been used to read a byte from the read memory area.

Exemplary Embodiment: Randomizing AES MixColumns Operation

An AES MixColumns operation may use a specific sequence of operations on specific data (an AES state column). The following formulas describe the AES MixColumns operation on a single column.

$$b_0 = 2 \cdot a_0 + 3 \cdot a_1 + a_2 + a_3$$

$$b_1 = a_0 + 2 \cdot a_1 + 3 \cdot a_2 + a_3$$

$$b_2 = a_0 + a_1 + 2 \cdot a_2 + 3 \cdot a_3$$

$$b_3 = 3 \cdot a_0 + a_1 + a_2 + 2 \cdot a_3$$

Note that multiplications $2 \cdot a_x$ and $3 \cdot a_x$ represent a multiplication in a $GF(2^8)$ and additions represent a bitwise exclusive-OR operation (XOR). Hence, the order in which the individual operands are exclusive-OR combined is not decisive for the results of the AES MixColumns operation.

Furthermore, the operation may use a temporary state variable "TEMP" of 16 bytes to store intermediate results.

The following Verilog-like description shows an exemplary functionality of the ARU 102 when configured for such AES MixColumns operation:

```
1   initial
2       reset RPG for values 0-15;
3       i = RPG( );
4   always
5       if RAM_READ_ACCESS
6           y = {i[3:2], i[1:0] + x[1:0]};
7       else
8           y = i;
9       if RAM_WRITE_ACCESS
10          i = RPG( );
```

Initially, a random permutation generator (RPG) in the ARU is reset to zero, i.e. all values from 0 to 15 are available for selection (line 2). Then, the first value (i) of a random permutation is generated (line 3).

An output address y is generated depending on the type of a RAM access. If a read access is generated (line 6) the ARU generates an address for a specific byte based on the random value i and a source address x provided by the software. Hence, the random value i[3:2] determines the current column, the source address x[1:0] determines the current byte of the current column and random value I[1:0] determines the output byte address of the current column. The software may ensure that the source address is correctly generated and all four bytes of the current column are correctly multiplied and XORed together to calculate the result byte.

In case of a write access, the ARU generates the output address y, which equals the current random value i (line 8). At the same time a new random value is generated (line 10).

The operation finishes when all 16 values have been selected.

Exemplary Embodiment: Random Read of Shares from Memory

Essentially, the ARU functionality to perform a random read of shares from a memory may correspond to an AES S-box operation. The difference may be determined by the operation provided by the software to the data read from the memory before it is written back.

The examples suggested herein may in particular be based on at least one of the following solutions. In particular combinations of the following features could be utilized in order to reach a desired result. The features of the method could be combined with any feature(s) of the device, apparatus or system or vice versa.

A device for a memory access is suggested, the device comprising
   a first component for conducting operations on the memory,
   a second component for accessing the memory in a randomized manner,
   wherein the first component conducts at least a portion of the operations via the second component.

Hence, the overall operation is distributed among two units, i.e. the first and second component. These may be arranged on the same die, circuit or piece of silicon. Alternatively, they may be arranged on different such pieces. By allowing to randomize a memory access for the portion of operations (e.g., operations that may be conducted in parallel) an attacker is confronted with the additional difficulty that some memory accesses are (or may appear) arbitrary. Hence, by probing only the first component, the attackers cannot easily determine at what time which data value is processed. This increases the safety of the device.

It is in particular an option that the communication between the first component and the second component has at least some protection against tampering and/or sniffing.

It is a further option that the first component and the second component are separate physical elements with a communication link between each other.

It is noted that "randomized manner" may be based on a random value. The random value mentioned herein may be an actual random value or a pseudorandom value.

In an embodiment, the device further comprises a random number generator for providing a random value to the second component for accessing the memory in the randomized manner.

In an embodiment, the second component accesses the memory in the randomized manner
   by determining a mapped address based on an address provided by the first component and the random value;
   by using the mapped address to access the memory.

Hence, the results of the portion of operations may be stored in memory in a memory area determined by the first component. However, the sequence accessing the memory is randomized via the second component, i.e. an additional piece of hardware that may be different from a software that runs on the first component.

In an embodiment, the second component comprises a random generator for providing a random value to the second component for accessing the memory in the randomized manner.

In an embodiment, the second component accesses the memory in the randomized manner
   by determining a mapped address based on an address provided by the first component and the random value;
   by using the mapped address to access the memory.

In an embodiment, the first component is a processor or a controller.

In an embodiment, the second component is an address randomization unit that is configured via the first component.

In an embodiment, the second component is configured via the first component by setting at least one of the following:
   a lower threshold for the randomized address range,
   an upper threshold for the randomized address range,
   a distribution or a type of the randomization.

Hence, a configuration may determine an address range of the memory which is to be used by the second component. The portion of operations is conducted on this address range, wherein the second component provides the randomized access.

As an option, the randomized access conducted by the second component may be permutated.

In an embodiment, the portion of the operations are operations that can be conducted in parallel.

In an embodiment, the portion of the operations are operations comprises one of the following:
   randomize an order of an access to a lookup table; in particular: randomize an order of AES S-box lookup operations;
   randomize an order of operations in commutative group operations;
   randomize an order of operations in associative group operations;
   randomize an order of an accumulation of terms in a sum or product;
   randomize an order of an accumulation of terms calculating a scalar product;
   randomize an order of an calculation of intermediate values in a vector or a matrix product; in particular: randomize an order of steps in a computation of an AES mix columns operation;
   randomize an order of operations on shares in a secret sharing scheme;
   randomize an order of accesses when reading components or shares of a secret key from a memory;
   randomize an order of operations in a symmetric cryptographic algorithm;
   randomize an order of operations in an asymmetric cryptographic algorithm;
   randomize an order of operations in a cryptographic hash algorithm.

In an embodiment, the second component comprises an internal state that is updated via a configuration provided by the first component.

In an embodiment, the internal state is set by a read or a write operation of the first component that is conducted via the second component.

In an embodiment, the second component accesses the memory in the randomized manner, wherein a randomized access of the second component to the memory is determined based on at least one of the following:
- a configuration of the second component,
- an access type provided by the first component,
- the input address provided by the first component,
- a random value,
- an internal state of the second component.

A second component is provided that is arranged for
- receiving an information regarding a memory access from a first component,
- accessing the memory in a randomized manner based on the information and based on a random value.

In an embodiment, the information is used for at least a portion of operations conducted by the first component via the second component.

A method is suggested for accessing a memory, the method comprising:
- accessing the memory in a randomized manner by a second component, wherein a first component conducts at least a portion of the operations via the second component.

The features described above are accordingly applicable for such method.

In an embodiment, the method further comprises:
- accessing the memory in the randomized manner by determining a mapped address based on an address provided by the first component and a random value and by using the mapped address to access the memory.

In an embodiment, the method further comprises:
- configuring the second component via the first component, wherein such configuration may comprise at least one of the following:
  - a lower threshold for the randomized address range,
  - an upper threshold for the randomized address range,
  - a distribution or a type of the randomization.

A computer program product is provided, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific FIGURE may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for a memory access, the device comprising:
   a component for conducting operations on the memory, wherein the component is a processor or a controller; and
   an address randomization unit configured to randomize, based on a random value, a sequence of the operations for accessing the memory,
   wherein the address randomization unit is configured via the component by setting at least one of the following:
      a lower threshold for the randomized address range,
      an upper threshold for the randomized address range, and
      a distribution or a type of the randomization.

2. The device according to claim 1, further comprising a random number generator configured to provide the random value to the address randomization unit for accessing the memory in the randomized manner.

3. The device according to claim 2, wherein the address randomization unit accesses the memory in the randomized manner
   by determining a mapped address based on an address provided by the component and the random value;
   by using the mapped address to access the memory.

4. The device according to claim 1, wherein the address randomization unit comprises a random generator configured to provide the random value to the address randomization unit for accessing the memory in the randomized manner.

5. The device according to claim 4, wherein the address randomization unit accesses the memory in the randomized manner
   by determining a mapped address based on an address provided by the component and the random value;
   by using the mapped address to access the memory.

6. The device according to claim 1, wherein the address randomization unit is configured via the component.

7. The device according to claim 1, wherein the operations are conducted in parallel.

8. The device according to claim 1, wherein the operations comprise one of the following:
   randomize an order of AES S-box lookup operations;
   randomize an order of operations in commutative group operations;
   randomize an order of operations in associative group operations;
   randomize an order of an accumulation of terms in a sum or product;
   randomize an order of an accumulation of terms calculating a scalar product;
   randomize an order of steps in a computation of an AES mix columns operation;
   randomize an order of operations on shares in a secret sharing scheme;
   randomize an order of accesses when reading components or shares of a secret key from a memory;
   randomize an order of operations in a symmetric cryptographic algorithm;
   randomize an order of operations in an asymmetric cryptographic algorithm; and
   randomize an order of operations in a cryptographic hash algorithm.

9. The device according to claim 1, wherein the address randomization unit comprises an internal state that is updated via a configuration provided by the component.

10. The device according to claim 9, wherein the internal state is set by a read or a write operation of the component that is conducted via the address randomization unit.

11. The device according to claim 1, wherein the address randomization unit accesses the memory in the randomized manner, wherein a randomized access of the address randomization unit to the memory is determined based on at least one of the following:
    a configuration of the address randomization unit,
    an access type provided by the component,
    the input address provided by the component,
    the random value, and
    an internal state of the address randomization unit.

12. An address randomization unit comprising:
    a receiver configured to receive an information regarding a memory access from a component, which is a processor or a controller, and
    an address randomization unit configured to randomize a sequence of operations for accessing the memory based on the information and based on a random value,
    wherein the address randomization unit is configured via the component by setting at least one of the following:
       a lower threshold for the randomized address range,
       an upper threshold for the randomized address range, and
       a distribution or a type of the randomization.

13. The address randomization unit according to claim 12, wherein the information is used for at least a portion of the sequence of operations conducted by the component via the address randomization unit.

14. A method for accessing a memory comprising:
    receiving, by an address randomization unit, a random value; and
    randomizing, by the address randomization unit, a sequence of operations for accessing the memory based on the random value,
    and
    wherein the address randomization unit is configured via the component by setting at least one of the following:
       a lower threshold for the randomized address range,
       an upper threshold for the randomized address range, and
       a distribution or a type of the randomization, and
    wherein the sequence of operations are conducted by a component, which is a processor or a controller.

15. The method according to claim 14, further comprising:
    accessing the memory in the randomized manner by determining a mapped address based on an address provided by the component and the random value and by using the mapped address to access the memory.

16. The method according to claim 14, further comprising:
    configuring the address randomization unit via the component, wherein such configuration is based on at least one of the following:
       a lower threshold for a randomized address range,
       an upper threshold for the randomized address range, and
       a distribution or a type of the randomization.

* * * * *